Patented July 7, 1953

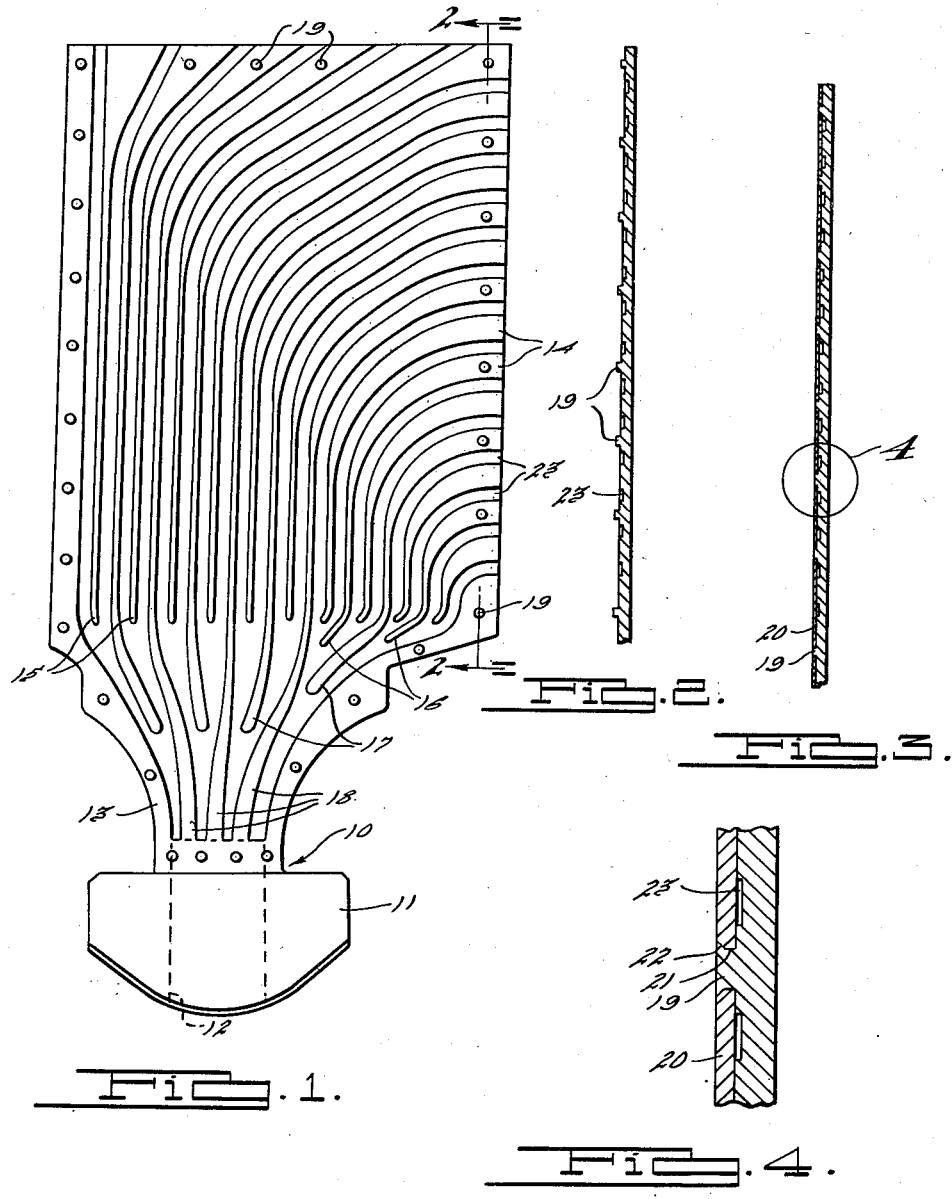

2,644,665

UNITED STATES PATENT OFFICE 2,644,665

ARTICLE WITH PASSAGES

Luigi Cangemi, Detroit, Mich., assignor to Chrysler Corporation, Highland Park, Mich., a corporation of Delaware Application December 13, 1947, Serial No. 791,613

3 Claims. (Cl. 253—39.15)

This application relates to an article having a plurality of passages extending therethrough and to the process for producing the article. More specifically it relates to a turbine blade having a plurality of small cooling passages and to the process for making the turbine blade.

It may be desirable to provide an article exposed to high temperatures such as a turbine blade with a plurality of small passages through which air may be forced either by centrifugal force or by an appropriate pressure differential. It is difficult to form the article with small passages.

I have invented a novel article such as a turbine blade with passages and a method of producing the same involving making separate parts and joining the parts as by riveting.

An object of the present invention is to produce an article such as a turbine blade having a plurality of passages therein.

A further object is to produce an article such as a turbine blade from a plurality of parts.

Other objects will appear from the disclosure.

In the drawings:

Fig. 1 is a developed view of a blank used in forming a turbine blade according to the present invention;

Fig. 2 is a sectional view taken on the line 2—2 of Fig. 1;

Fig. 3 is a sectional view taken in the same location but with a second part added to the blank; and Fig. 4 is an enlarged sectional view of the portion of Fig. 3 within the circle 4.

The reference character 10 designates a blank used in forming a turbine blade. The blank 10 is shown in Fig. 1 in flat or developed form for the sake of simplicity. It will be understood that the blank may be curved from right to left out of the plane of the drawing, in order that the turbine blade of which the blank forms a part may have a similar curvature. The blank 10 has an enlarged base or root 11 to which extends the passage 12. Adjoining the root 11 is a neck 13 and beyond that a wide blade-forming portion 14. The neck 13 and wide portion 14 carry a plurality of ridges that have curved and straight portions and terminate in the tip of the wide portion 14 and in one side thereof. Certain alternate ridges designated by 15 terminate near the end of the wide portion 14 at the neck 13. Certain other ridges designated by 16 extend just beyond the ridges 15 toward the neck 13 and still other ridges 17 terminate in the neck 13, and remaining ridges 18 terminate in a region of the neck 13 where the passage 12 ends. The spaces or grooves between the ridges are in communication with the passage 12. The blank 10 has a plurality of projections 19 positioned in spaced relation to one another along the sides of the neck 13 and the wide portion 14 and the end of the wide portion 14. As shown in Fig. 3, a plate or cover 20 is placed on the blank 10 so as to cover the neck 13 and wide portion 14, the cover having openings 21 receiving the projections 19. As seen in Fig. 4, each opening 21 in the cover 20 has a countersink portion. The projections 19 are upset, as indicated in Fig. 4, into the countersunk portions 22 so as to be formed into rivets securing the plate 20 to the blank 10. The cover or plate 20 cooperates with the grooves between the ridges on the blank 10 to form passages 23 communicating with the passage 12 in the blade root 11. The blank 10 may be formed of a suitable material such as cast Stellite.

In operation the turbine blade will be held by the root portion in a rotating carrier. Air flows outwardly through the root passage 12 and through the passages 23 either by centrifugal force or an appropriate pressure differential or both to cool the turbine blade, which will be subjected to very high temperatures when used in a gas turbine. For effective cooling, the passages must be very small and there must be a large number of them. By producing the turbine blade in the manner described involving riveting two parts together, I have been able to achieve the provision of a large number of small passages.

I claim:

1. An internally cooled turbine blade of a generally elongated shape having first and second elongated outer faces presenting substantially uninterrupted surfaces having internal cooling passages of a common size in corresponding spacing below the uninterrupted surface of the first of the elongated outer faces thereof for uniformity in cooling, said turbine blade being fabricated from components comprising an elongated cast Stellite blank presenting a first smooth elongated face serving as the first of the elongated outer blade faces and further presenting an internal elongated blade face, and being provided with means forming a longitudinal ridge along one lateral edge of said internal elongated blade face, means forming a plurality of substantially parallel ridges on said internal elongated blade face curving from a general longitudinal disposition to a generally oblique disposition terminating at spaced locations at a bias along the tip edge of said internal face, a thin Stellite cover sheet of predetermined thickness received on the ridges for coextensively overlying said internal elongated blade face in a manner to define the aforesaid cooling passages between successive ridges, said cover sheet being provided with openings therein along its margin, and attachment projections integral with said ridges and projecting normally thereto in registered reception in the sheet openings for completely filling the openings and presenting with the sheet the aforesaid uninterrupted surface of the second elongated outer face of the turbine blade.

2. An internally cooled turbine blade of a generally elongated shape having first and second elongated outer faces presenting substantially uninterrupted surfaces and having internal cooling passages of a common size in corresponding spacing below the uninterrupted surface of the first of the elongated outer faces thereof for uniformity in cooling, said turbine blade being fabricated from components comprising an elongated cast Stellite blank presenting a first smooth elongated face serving as the first of the elongated outer blade faces and further presenting an internal elongated blade face, and being provided with means forming a longitudinal ridge along one of two opposite lateral edges of said internal elongated blade face, means forming a plurality of substantially parallel ridges on said internal elongated blade face curving from a general longitudinal disposition to a generally oblique disposition terminating at spaced locations at a bias along the tip edge of said internal face, a thin Stellite cover sheet of predetermined thickness received on the ridges for coextensively overlying said internal elongated blade face in a manner to define the aforesaid cooling passages between successive ridges, said cover sheet being provided with openings therein along its margin, and attachment projections integral with said ridges and projecting normally thereto in registered reception in the sheet openings for completely filling the openings and presenting with the sheet the aforesaid uninterrupted surface of the second elongated outer face of the turbine blade, and said attachment projection comprising Stellite lugs of a workable form for being upset into permanent attachment with said sheet, the margin of said cover and the attachment projections and said longitudinal ridge on said blank being cooperatively arranged and spaced to provide an uninterrupted sealing engagement along said one lateral edge of the latter, the margin of said cover and said substantially parallel ridges cooperating to define a plurality of spaced openings for passages along the other of said opposite lateral edges, and a plurality of spaced openings for the passages along the tip edge of the blank.

3. A cooled turbine blade having a plurality of curved cooling passages terminating in the tip and in one edge and being formed of a cast sheet member having openings countersunk at one side, and a second member having curved ridges and grooves terminating in the tip and one edge and cooperating with the other side of the cast sheet member to form the aforesaid passages, and filling projections integral with and projecting from the second member and being wholly contained within the dimensions of the countersunk openings in the cast sheet member for unprotrusively holding the members together.

LUIGI CANGEMI.

References Cited in the file of this patent

UNITED STATES PATENTS

| Number | Name | Date |
|---|---|---|
| 1,484,579 | Still | Feb. 19, 1924 |
| 1,937,966 | Junkers | Dec. 5, 1933 |
| 1,947,347 | Lorenzen | Feb. 13, 1934 |
| 2,221,684 | Smith | Nov. 12, 1940 |
| 2,332,640 | Hyde | Oct. 26, 1943 |
| 2,407,531 | Birmann | Sept. 10, 1946 |

FOREIGN PATENTS

| Number | Country | Date |
|---|---|---|
| 100,283 | Switzerland | 1923 |
| 232,574 | Great Britain | Apr. 1, 1926 |
| 319,622 | Great Britain | Dec. 18, 1930 |
| 594,931 | Germany | Mar. 23, 1934 |